United States Patent [19]
Nelson

[11] 3,999,583
[45] Dec. 28, 1976

[54] FASTENING DEVICE
[75] Inventor: John F. Nelson, New Lenox, Ill.
[73] Assignee: Illinois Tool Works Inc., Chicago, Ill.
[22] Filed: Dec. 15, 1975
[21] Appl. No.: 640,527
[52] U.S. Cl. .................................. 151/41.75; 151/7
[51] Int. Cl.² ......................................... F16B 39/00
[58] Field of Search ................ 151/41.75, 41.76, 7; 85/32 R, 32 V, 36; 24/255 R, 255 SL, 259 TF, 230 F, 201 S, 201 C

[56] References Cited
UNITED STATES PATENTS

| | | | |
|---|---|---|---|
| 2,298,568 | 10/1942 | Kost | 151/41.75 |
| 2,836,216 | 5/1958 | Rapata | 151/41.75 |
| 2,904,820 | 9/1959 | Flora | 151/41.75 X |
| 3,156,765 | 11/1964 | Weiss | 24/201 C |
| 3,414,034 | 12/1968 | Imse | 151/7 |
| 3,414,035 | 12/1968 | Munse | 151/41.75 |
| 3,426,818 | 2/1969 | Derby | 151/41.75 |
| 3,478,801 | 11/1969 | Van Niel | 151/41.75 |

Primary Examiner—Ramon S. Britts
Attorney, Agent, or Firm—Jack R. Halvorsen; Robert W. Beart

[57] ABSTRACT

A one-piece plastic U-nut for retention on the edge of an apertured panel wherein the device is capable of accepting a wide variety of panel thicknesses.

4 Claims, 6 Drawing Figures

FASTENING DEVICE

BACKGROUND OF THE INVENTION

This invention relates to a fastening device for mounting on the edge of an apertured panel wherein the device embraces the panel adjacent its edge and provides screw receiving means aligned with an aperture positioned adjacent to said edge. Devices of this type are well known in the art, as exemplified by U.S. Pat. Nos. 2,233,230; 2,298,568; 3,308,708; and 3,557,655. Each of these devices disclose a generally U-shaped body member capable of being mounted over the edge of a panel and align a screw receiving means over an aperture in the panel.

Certain of the devices also show cam faced embossments for engaging one surface of the panel for the purpose of spreading the legs of the clip during installation and thence serving as a stop means to engage a wall of the aperture for preventing removal of the clip. The use of a tubular threaded carrying means having specific threads imposed therein is shown in the U.S. Pat. to Coe, No. 3,557,655; while the other patents, referred to above, show single thread or multiple thread engaging means struck from a sheet metal leg.

Each of these devices has limitations as to the accommodation of varying thickness panels, thereby requiring a wider inventory of parts for various applications in the assembly operations found in a manufacturing facility. The use of sheet metal nuts additionally creates a maintenance problem for later replacement when they inherently deteriorate through rusting or other problems such as seizing of the screw thread thereby not permitting ready removal for repairs.

SUMMARY OF THE INVENTION

It is an object of the present invention to provide a one-piece plastic self-retaining nut capable of accepting a wide variety of panel thicknesses.

A further object of the present invention is to provide a one-piece plastic self-retained nut which is easy to assemble, economical to fabricate and retains its removeability factor for the life of the part.

Other objects and improvements of the present invention will be apparent to those skilled in the art.

DETAILED DESCRIPTION OF THE INVENTION

Figure 1:
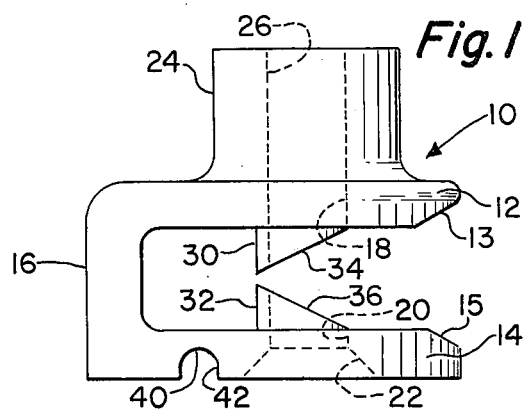
FIG. 1 is a side elevational view of a preferred embodiment of the present invention.
Figure 2:
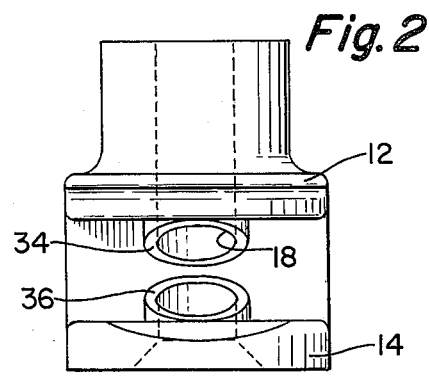
FIG. 2 is an end elevational view of the preferred embodiment of the present invention.
Figure 3:
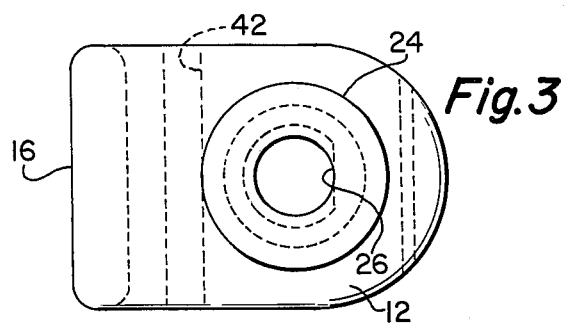
FIG. 3 is a top plan view of the device shown in FIGS. 1 and 2.

Referring now to the drawing wherein similar parts are identified by similar numerals, the preferred embodiment of the present invention is a self-retained nut 10 including a first leg 12 connected in spaced relation to a second leg 14 by a bight portion 16. The first and second legs have aligned bores 18,20, respectively, with bore 20 including a countersunk or tapered entering portion 22 for ease of entry of a screw into the bore. Mounted on leg 12 is a screw receiving nut-like body 24 having a through bore 26 communicating with bore 18 in leg 12. In this embodiment, the bores 18,20,26 are unthreaded; however, it should be understood that they could be threaded for particular applications.

Surrounding each of the bores and extending inwardly from each of the legs are cylindrical members 30,32. These are provided with tapered or biased faces 34,36 which present converging surfaces in the direction of the bight portion 16 to form an open throat facing the free end of the legs for purposes best set forth hereinafter.

Figure 4:
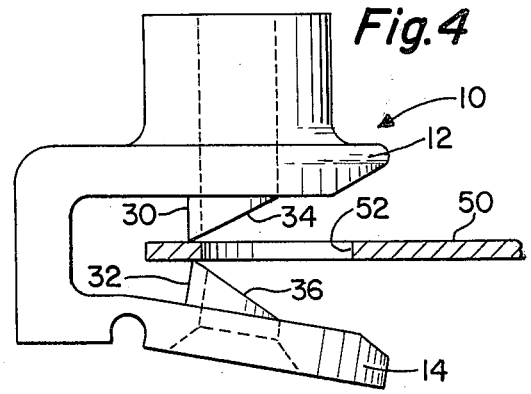
FIG. 4 is a side elevational view in partial section showing the preferred embodiment being applied to a thin apertured panel.

The leg 14 is provided with a hinge portion 40 that is spaced from bight portion 16 and takes the form of a U-shaped groove 42 parallel to bight portion 16 and is capable of flexing leg 14 angularly relative to leg 12. As best seen in FIG. 4, when the nut 10 is applied to the edge of a panel 50 having an aperture 52, adjacent to but spaced from said edge, the panel 50 will be lead into the throat between the legs by the tapered or cam edges 13,15 on the free ends of legs 12,14, respectively, and then will engage the cam surfaces 34,36 of the cylindrical members 30,32 and cause the leg 14 to flex angularly away from the leg 12. As the clip proceeds to the right, as viewed in FIG. 4, the leg 14 will remain in its angular position until the tubular or cylindrical portions 30,32 are aligned with the aperture 52, at which time the tubular elements 30,32 will move into aperture 52 and prevent retrograde removal of the nut 10. This device then is ready to accept a secondary element to be retained by a thread forming screw having a pitch diameter substantially equal to the diameter of bores 18,20,26 whereby threads will be imposed on the interior of the bores. It is contemplated that bore 20 could be equal to or larger than the major diameter of the screw to serve as a pilot hole.

Figure 5:
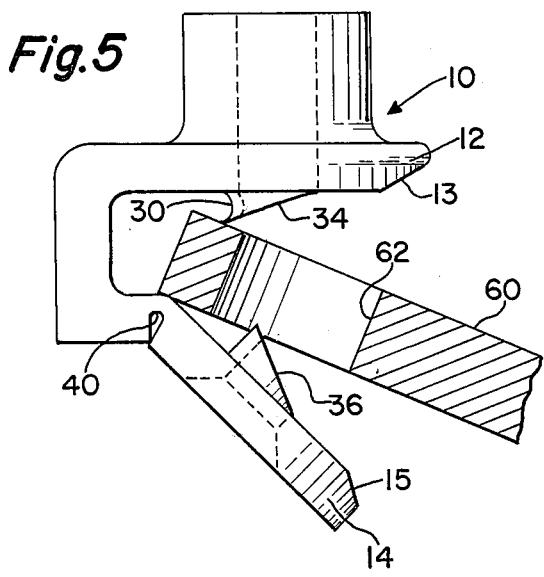
FIG. 5 is a side elevational view in partial section of the preferred embodiment to a thick apertured panel.
Figure 6:
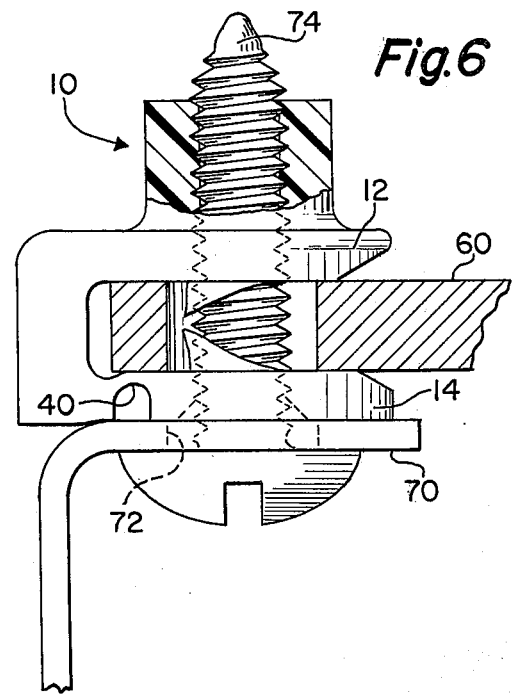
FIG. 6 is a side elevational view in partial section of the preferred embodiment of the present invention shown in installed position on a thick apertured panel.

Referring now to FIGS. 5 and 6, it will be seen that the device is capable of accepting a panel 60 having an aperture 62 therein wherein panel 60 is of substantially greater thickness than the previously mentioned panel 50. The hinge portion 40, with its wide groove 42, permits a maximum angular displacement of leg 14 to accommodate the thick panel 60. The tubular member 30 is flexible so as to be capable of distorting out of the way of the free edge of panel 60 during the application of the nut 10 thereto. When the cam surfaces 34,36 pass the edge wall of aperture 62, they then move inwardly toward their initial position to retain the nut 10 in mounted relation to panel 60. The device 70, which is to be mounted to panel 60, includes an aperture 72 for accommodating a screw 74 through aperture 72 into the bores 18,20,26. Preferably, the screw 74 is of the thread forming or thread cutting variety whereby threads are impressed on the unthreaded bores. In FIG. 6, it will be noted that the hinge portion 40 is capable of displacement to permit leg 14 to be moved parallel to leg 12 in intimate gripping relationship around the panel 60 as the compressive forces are applied to the nut 10. Similarly, if a thicker panel were utilized, the hinge would be capable of displacement in the opposite direction. Although not shown in the drawing, when a screw is applied to the nut 10 shown in the application of FIG. 4, with a thin sheet or panel 50, the leg 14 will be displaced toward the leg 12 and the tubular means 30,32 are capable of being distorted and deflected to insure a tight gripping of panel 50.

It should be noted that the bores in both legs are substantially equal in diameter to the pitch diameter of the screw to be used with this nut. In the prior art, there normally is a clearance hole in the first leg through which the screw is introduced. When a power screw driver is used in applying a screw to such a prior art device, and undue force is applied by the operator, those devices have been known to bend, distort and be pushed off of the panel. In the present device, when such forces are applied, they are met by leg 14 acting against the panel during tapping of bore 20 and thereby obviate the problem.

The embodiment disclosed hereinabove can be fabricated by injection molding techniques from suitable material, such as nylon. The self-retained nut is capable of accommodating panel thickness variations from 0.025 inches to 0.150 inches. It will be appreciated that this variation in tolerance thicknesses can be changed or modified by changing the particular dimensions of the overall retained nut structure.

I claim:

1. A one-piece plastic retained nut adapted for mounting on the edge of an apertured panel, said nut including a U-shaped body portion including a pair of spaced legs extending normally to a bight portion, each of said legs having aligned through bores and each having screw engaging means with one of said legs having supplemental screw engaging means co-axial with the leg bore, the bore of each screw engaging means has a diameter substantially equal to the pitch diameter of a screw to be accepted therein, the second of said legs spaced from the first leg having a flexible hinge portion which includes a relieved slot extending transversely of the leg parallel to and spaced from the bight portion, thereby permitting both angular movement and parallel shifting of said second leg relative to said first leg, said flexible hinged portion capable of permitting the substantially parallel spaced distance between the two legs to be adjusted when compressive forces are applied to the second leg to accommodate thicknesses of panels less than the initial spaced distance between said legs, and locating means extending from at least one of said legs toward the other leg for orienting said fastener relative to an aperture in the panel adjacent the edge thereof, whereby said retained nut legs are mounted in embracing relation on opposite sides of the apertured support panel.

2. A device of the type claimed in claim 1 wherein said supplemental screw engaging means includes an integral, unthreaded body positioned on the first of said legs on the side opposite the second leg and including an unthreaded through bore communicating with the bore in said leg.

3. A device of the type claimed in claim 2 wherein said locating means includes a pair of cylindrical members each of which extend inwardly from one of said legs and surrounding the bore through each leg, each of said cylindrical members presenting an angularly disposed free end to form a pair of converging surfaces in the direction of said bight portion to accommodate the panel in the open throat formed by said angularly disposed surfaces as the clip is mounted over the edge of the panel, the angularly disposed surfaces on the cylindrical member mounted on the second leg serving as a cam to bend the leg during installation on the apertured panel.

4. A device of the type claimed in claim 3 wherein said cylindrical members are resilient and capable of flexing.

* * * * *